United States Patent
Aoyagi et al.

(10) Patent No.: US 10,189,291 B2
(45) Date of Patent: Jan. 29, 2019

(54) METHOD FOR PRODUCING SUPPORT FOR THERMAL TRANSFER IMAGE-RECEIVING SHEET AND METHOD FOR PRODUCING THERMAL TRANSFER IMAGE-RECEIVING SHEET

(71) Applicant: Dai Nippon Printing Co., Ltd., Tokyo (JP)

(72) Inventors: Makoto Aoyagi, Tokyo (JP); Taku Nishikawa, Tokyo (JP); Daisuke Fukui, Tokyo (JP); Munenori Ieshige, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/129,484

(22) PCT Filed: Mar. 27, 2015

(86) PCT No.: PCT/JP2015/059714
§ 371 (c)(1),
(2) Date: Sep. 27, 2016

(87) PCT Pub. No.: WO2015/147289
PCT Pub. Date: Oct. 1, 2015

(65) Prior Publication Data
US 2017/0100952 A1 Apr. 13, 2017

(30) Foreign Application Priority Data
Mar. 27, 2014 (JP) .................................. 2014-066666

(51) Int. Cl.
*B41M 5/44* (2006.01)
*B32B 5/18* (2006.01)
(Continued)

(52) U.S. Cl.
CPC .................. *B41M 5/44* (2013.01); *B32B 3/26* (2013.01); *B32B 5/18* (2013.01); *B32B 7/12* (2013.01);
(Continued)

(58) Field of Classification Search
CPC .......... B41M 5/382; B41M 5/41; B41M 5/42; B41M 5/44; B41M 5/50; B41M 5/52;
(Continued)

(56) References Cited

U.S. PATENT DOCUMENTS

2005/0026779 A1 2/2005 Omata et al.

FOREIGN PATENT DOCUMENTS

JP 09-177000 A1 7/1997
JP 2004-262075 A1 9/2004
(Continued)

OTHER PUBLICATIONS

Weiss, Herbert L. et al., "*Coating and Laminating Machine*," Kabushiki Kaisha Kako Gijutsu Kenkyukai, Feb. 29, 1996, pp. 27, 28 and 133-137.

(Continued)

*Primary Examiner* — Bruce H Hess
(74) *Attorney, Agent, or Firm* — Burr & Brown, PLLC

(57) ABSTRACT

Provided is a method for producing a support for a thermal transfer image-receiving sheet, including laminating a substrate and a porous film by a melt-extruded resin while passing the substrate and the porous film through a portion between rollers in a pair, wherein a thermal transfer image-receiving sheet excellent in adhesiveness between the substrate and the porous film and excellent in the texture of a print surface can be obtained. A method for producing a support for a thermal transfer image-receiving sheet according to the present invention is a method for producing a support for a thermal transfer image-receiving sheet includ- (Continued)

ing a substrate layer composed of a substrate, an adhesive layer composed of a melt-extruded resin, and a porous layer including a porous film that are layered in the order mentioned, in which the substrate and the porous film are laminated by the melt-extruded resin while passing the substrate and the porous film through the portion between rollers in a pair having a spacing with a distance d; and a difference (d−h) between the distance d which is the spacing between the rollers in the pair and the total thickness h of the substrate layer, the adhesive layer, and the porous layer is −50 μm or more and 50 μm or less.

15 Claims, 1 Drawing Sheet

(51) Int. Cl.
  *B41M 5/52* (2006.01)
  *B32B 7/12* (2006.01)
  *B32B 27/06* (2006.01)
  *B41M 5/41* (2006.01)
  *B32B 27/32* (2006.01)
  *B32B 3/26* (2006.01)
  *B32B 27/08* (2006.01)
  *B32B 27/10* (2006.01)
  *B32B 27/20* (2006.01)
  *B32B 37/02* (2006.01)
  *B32B 37/10* (2006.01)
  *B32B 37/15* (2006.01)
  *B32B 23/08* (2006.01)
  *B32B 29/00* (2006.01)
  *B41M 5/42* (2006.01)
  *B32B 37/12* (2006.01)

(52) U.S. Cl.
  CPC .............. *B32B 23/08* (2013.01); *B32B 27/06* (2013.01); *B32B 27/065* (2013.01); *B32B 27/08* (2013.01); *B32B 27/10* (2013.01); *B32B 27/205* (2013.01); *B32B 27/32* (2013.01); *B32B 27/327* (2013.01); *B32B 29/002* (2013.01); *B32B 37/02* (2013.01); *B32B 37/10* (2013.01); *B32B 37/153* (2013.01); *B41M 5/41* (2013.01); *B41M 5/52* (2013.01); *B32B 2037/1223* (2013.01); *B32B 2250/03* (2013.01); *B32B 2255/10* (2013.01); *B32B 2255/26* (2013.01); *B32B 2305/026* (2013.01); *B32B 2305/30* (2013.01); *B32B 2307/402* (2013.01); *B32B 2307/4023* (2013.01); *B32B 2307/538* (2013.01); *B32B 2307/732* (2013.01); *B32B 2317/12* (2013.01); *B32B 2323/04* (2013.01); *B32B 2323/10* (2013.01); *B41M 5/42* (2013.01); *B41M 2205/02* (2013.01); *B41M 2205/06* (2013.01); *B41M 2205/32* (2013.01); *B41M 2205/38* (2013.01)

(58) Field of Classification Search
  CPC   B41M 2205/02; B41M 2205/32; B41M 5/40; B32B 37/02; B32B 37/10; B32B 37/1054; B32B 5/18; B32B 27/32
  USPC .......................... 503/227; 156/582; 502/227
  See application file for complete search history.

(56) References Cited

FOREIGN PATENT DOCUMENTS

| | | |
|---|---|---|
| JP | 2004-330442 A1 | 11/2004 |
| JP | 2004-345267 | 12/2004 |
| JP | 2007-098926 A1 | 4/2007 |

OTHER PUBLICATIONS

International Preliminary Report on Patentability (PCT/JP2015/059714) dated Oct. 6, 2016.
International Search Report and Written Opinion (Application No. PCT/JP2015/059714) dated May 19, 2015.
Japanese Office Action from a corresponding Japanese patent application (Japanese Application No. 2015-067355) dated Nov. 30, 2018, 5 pages.

METHOD FOR PRODUCING SUPPORT FOR THERMAL TRANSFER IMAGE-RECEIVING SHEET AND METHOD FOR PRODUCING THERMAL TRANSFER IMAGE-RECEIVING SHEET

TECHNICAL FIELD

The present invention relates to a method for producing a support for a thermal transfer image-receiving sheet. More particularly, the present invention relates to a method for producing a support for a thermal transfer image-receiving sheet, comprising laminating a substrate and a porous film with a melt-extruded resin while passing the substrate and the porous film through a portion between rollers in a pair. Further, the present invention relates to a method for producing a thermal transfer image-receiving sheet, comprising layering a color material-receiving layer on the porous layer of the support for a thermal transfer image-receiving sheet.

BACKGROUND ART

A support for a recording material produced by performing melt extrusion coating of thermoplastic resin on at least one side of a support such as base paper has been used by applying a photographic emulsion, a heat-sensitive material, and the like to the support. In the support for a recording material, the smoothness of a surface of the support prior to the application of the emulsion and the like has been known to be significant for obtaining a high-quality image. It is common that a method for producing the support for a recording material is a method in which thermoplastic resin melted at high temperature by an extrusion coating method is cast on a surface of transporting base paper, and nipped and coated between a press roller coated with elastomeric resin and a cooling roller via the base paper.

A method of setting the nip pressure, a method of increasing the thickness of a thermoplastic resin layer, a method of increasing the nip pressure during coating of thermoplastic resin, calender treatment for enhancing the smoothness of base paper, or the like has been known as a method for improving the smoothness of a surface of a support produced by melt-coating. However, the method of nipping a support and a resin is affected by the surface geometry of the support, the method of increasing the thickness of the resin is disadvantageous in view of a cost, and the calender treatment method results in the increased number of facilities and steps and is disadvantageous in view of a cost. None of the methods result in smoothness that can be sufficiently satisfied.

In order to solve such problems, there is proposed a method for producing a support for a recording material obtained by coating at least one side of a support such as base paper with thermoplastic resin extruded by a melt extrusion coating method, wherein the resin and the support such as base paper are passed through a gap set to have a distance of not less than the thickness of the support to be coated and less than the thickness of the coated support between a cooling roller and a press roller in a pair, and the support is coated (see Patent Literature 1).

However, a method for producing a support for a recording material having surface smoothness providing excellent texture in lamination of a substrate as a support and a porous film has not been conventionally known.

CITATION LIST

Patent Literature

[Patent Literature 1] Japanese Patent Laid-Open Publication No. 9-177000

SUMMARY OF INVENTION

Technical Problem

The present invention was made under the background technologies described above with an object to provide a method for producing a support for a thermal transfer image-receiving sheet, comprising laminating a substrate and a porous film by a melt-extruded resin while passing the substrate and the porous film through a portion between rollers in a pair, wherein a thermal transfer image-receiving sheet excellent in adhesiveness between the substrate and the porous film and excellent in the texture of a print surface can be obtained.

Solution to Problem

As a result of intensive examination, the present inventors found that it is possible to improve adhesiveness between a substrate and a porous film without crushing voids in the porous film and to improve the texture of a print surface of a thermal transfer image-receiving sheet using an obtained support for a thermal transfer image-receiving sheet by regulating the spacing between rollers in a pair when the substrate and the porous film is laminated by a melt-extruded resin while passing the substrate and the porous film through a portion between the rollers in a pair. The present invention was accomplished based on such findings.

In other words, according to one aspect of the present invention, there is provided a method for producing a support for a thermal transfer image-receiving sheet comprising a substrate layer composed of a substrate, an adhesive layer composed of a melt-extruded resin, and a porous layer composed of a porous film that are layered in the order mentioned, wherein the substrate and the porous film are laminated by the melt-extruded resin while passing the substrate and the porous film through the portion between rollers in a pair having a spacing with a distance d; and a difference (d−h) between the distance d which is the spacing between the rollers in the pair and the total thickness h of the substrate layer, the adhesive layer, and the porous layer is −50 µm or more and 50 µm or less.

In the aspect of the present invention, it is preferable that the distance d which is the spacing between the rollers in the pair is 150 µm or more and 350 µm or less, and the total thickness h is 150 µm or more and 350 µm or less.

In the aspect of the present invention, it is preferable that the adhesive layer is 10 µm or more.

In the aspect of the present invention, it is preferable that the rollers in the pair comprise a press roller and a cooling roller.

In the aspect of the present invention, it is preferable that the press roller is a rubber roller, and the cooling roller is a metallic roller.

In the aspect of the present invention, it is preferable that the substrate is arranged to be closer to the press roller, the porous film is arranged to be closer to the cooling roller, and the substrate and the porous film are passed through a portion between the press roller and the cooling roller.

In the aspect of the present invention, it is preferable that the surface of the cooling roller has a ten-point average roughness (Rz) of 0 µm or more and 10 µm or less.

In the aspect of the present invention, it is preferable that the melt-extruded resin is polyolefin resin having a melting point of 100° C. or more, measured according to JIS K7121.

In the aspect of the present invention, it is preferable that a backing layer composed of a resin is further disposed on the side of the substrate layer opposite to the adhesive layer.

According to another aspect of the present invention, there is provided a method for producing a thermal transfer image-receiving sheet, comprising further layering a color material-receiving layer on the porous layer of the support for a thermal transfer image-receiving sheet obtained by the production method described above.

According to another aspect of the present invention, there is provided a method for producing a thermal transfer image-receiving sheet comprising a substrate layer composed of a substrate, an adhesive layer composed of a melt-extruded resin, a porous layer composed of a porous film, and a color material-receiving layer that are layered in the order mentioned, wherein the substrate and the porous film on one side of which the color material-receiving layer is formed in advance are laminated by the melt-extruded resin while passing the substrate and the porous film through a portion between rollers in a pair having a spacing with a distance d such that the substrate and the other side of the porous film face each other; and a difference (d−h) between the distance d which is the spacing between the rollers in the pair and the total thickness h of the substrate layer, the adhesive layer, the porous layer, and the color material-receiving layer is −50 µm or more and 50 µm or less.

In another aspect of the present invention, it is preferable that a primer layer is further disposed between the porous layer and the color material-receiving layer.

According to another aspect of the present invention, there is provided a thermal transfer image-receiving sheet comprising a substrate layer composed of a substrate, an adhesive layer composed of a melt-extruded resin, a porous layer composed of a porous film, and a color material-receiving layer that are layered in the order mentioned, wherein the substrate and the porous film are laminated by the melt-extruded resin while passing the substrate and the porous film through a portion between rollers in a pair having a spacing with a distance d, to form a support for a thermal transfer image-receiving sheet;

a difference (d−h) between the distance d which is the spacing between the rollers in the pair and the total thickness h of the substrate layer, the adhesive layer, and the porous layer is −50 µm or more and 50 µm or less; and the thermal transfer image-receiving sheet is obtained by further layering the color material-receiving layer on the porous layer of the support for a thermal transfer image-receiving sheet.

According to another aspect of the present invention, there is provided a thermal transfer image-receiving sheet comprising a substrate layer composed of a substrate, an adhesive layer composed of a melt-extruded resin, a porous layer composed of a porous film, and a color material-receiving layer that are layered in the order mentioned, wherein the thermal transfer image-receiving sheet is obtained by laminating the substrate and the porous film on one side of which the color material-receiving layer is formed in advance by the melt-extruded resin while passing the substrate and the porous film through a portion between rollers in a pair having a spacing with a distance d such that the substrate and the other side of the porous film face each other; and a difference (d−h) between the distance d which is the spacing between the rollers in the pair and the total thickness h of the substrate layer, the adhesive layer, the porous layer, and the color material-receiving layer is −50 µm or more and 50 µm or less.

Advantageous Effects of Invention

According to the present invention, there can be provided a method for producing a support for a thermal transfer image-receiving sheet, comprising laminating a substrate and a porous film by a melt-extruded resin while passing the substrate and the porous film through a portion between rollers in a pair, wherein a thermal transfer image-receiving sheet excellent in adhesiveness between the substrate and the porous film and excellent in the texture of a print surface can be obtained.

MODE FOR CARRYING OUT INVENTION

<Method for Producing Support for Thermal Transfer Image-Receiving Sheet>

A method for producing a support for a thermal transfer image-receiving sheet according to the present invention comprises laminating a substrate and a porous film with a melt-extruded resin while passing the substrate and the porous film into a portion between rollers in a pair between which a distance d which is a spacing between the rollers in the pair is regulated. A support for a thermal transfer image-receiving sheet comprising a substrate layer composed of a substrate, an adhesive layer comprising a melt-extruded resin, and a porous layer comprising a porous film that are layered in the order mentioned is obtained by such a production method. The distance d which is the spacing between the rollers in the pair refers to a distance between two points at which a straight line joining the centers of corresponding circles which are the cross sections of the rollers in the pair and the corresponding circles which are the cross sections cross.

Figure 1:
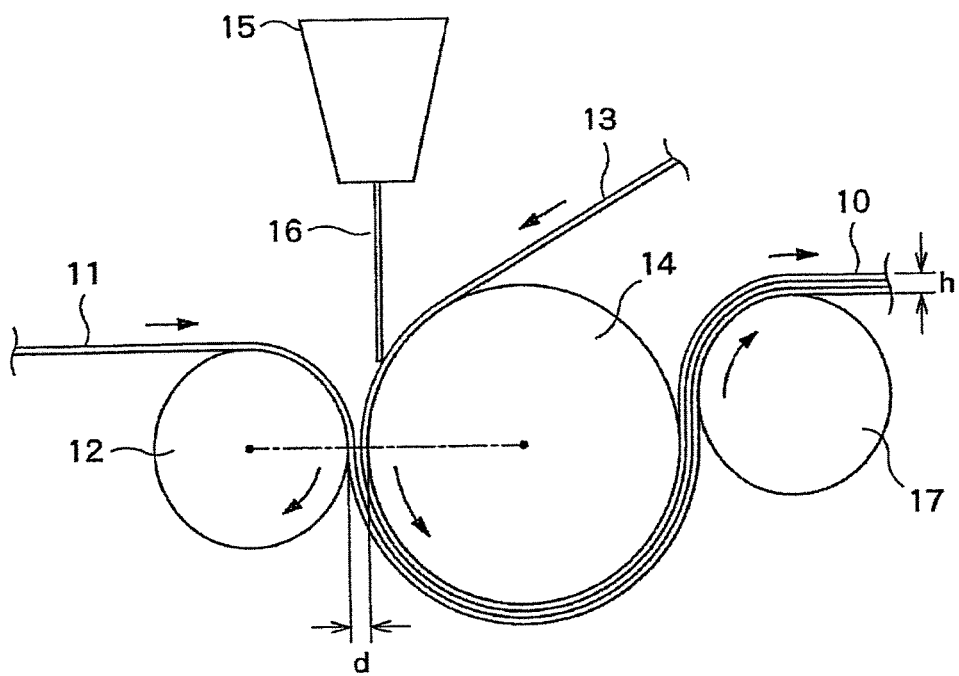
FIG. 1 is a schematic view illustrating one embodiment of a method for producing a support for a thermal transfer image-receiving sheet according to the present invention.

One embodiment of the method for producing a support 10 for a thermal transfer image-receiving sheet according to the present invention will be described with reference to FIG. 1. First, a substrate 11 is arranged on a press roller 12, and a porous film 13 is arranged on a cooling roller 14. Subsequently, a resin 16 is melt-extruded from a die 15 arranged above the press roller 12 and the cooling roller 14, and the substrate 11 and the porous film 13 are laminated with the melt-extruded resin 16 while passing the substrate 11 and the porous film 13 through a portion between the press roller 12 and the cooling roller 14 in a pair between which a distance d is regulated. Finally, the resultant was stripped from a stripping roller 17 to obtain the support 10 for a thermal transfer image-receiving sheet in which a substrate layer, an adhesive layer, and a porous layer are layered to have a total thickness h. The total thickness h is not necessarily a value obtained by simply adding the respective thicknesses of the substrate layer, the adhesive layer, and the porous layer prior to the lamination.

In the method for producing a support for a thermal transfer image-receiving sheet according to the present invention, the substrate and the porous film can be allowed to adhere to each other without crushing voids in the porous film by regulating the distance d which is the spacing between the rollers in the pair. Specifically, a difference (d−h) between the distance d which is the spacing between the rollers in the pair and the total thickness h of the substrate layer, the adhesive layer, and the porous layer is −50 μm or more and 50 μm or less, preferably −30 μm or more and 40 μm or less, more preferably 0 μm or more and 40 μm or less, and still more preferably 20 μm or more and 30 μm or less. When the difference between the distance d and the total thickness h is within around the range described above, it is possible to improve the adhesiveness between the substrate and the porous film without crushing the voids in the porous film and to improve the texture of a print surface of the obtained thermal transfer image-receiving sheet. A difference (d−h) between d and h of less than −50 results in deterioration of texture, while a difference (d−h) of more than 50 results in deterioration of adhesiveness. Further, when the distance d is more than the total thickness h, i.e., the difference (d−h) between d and h is more than zero, the voids in the porous film are hardly crushed, and therefore, the texture of the print surface of the obtained thermal transfer image-receiving sheet particularly becomes favorable.

In the present invention, it is preferable that the distance d which is the spacing between the rollers in the pair is 150 μm or more and 350 μm or less when the total thickness h of the substrate layer, the adhesive layer, and the porous layer is 150 μm or more and 350 μm or less. Further, it is more preferable that the distance d which is the spacing between the rollers in the pair is 160 μm or more and 250 μm or less when the total thickness h is 160 μm or more and 250 μm or less. The thickness of the adhesive layer is preferably 10 μm or more, more preferably 12 μm or more and 40 μm or less, and still more preferably 15 μm or more and 25 μm or less. It is possible to improve the adhesiveness between the substrate and the porous film without crushing the voids in the porous film and to improve the texture of the print surface of the obtained thermal transfer image-receiving sheet when the distance d, the total thickness h, and/or the thickness of the adhesive layer are within around the ranges described above.

It is preferable that the rollers in the pair comprise the press roller and the cooling roller. A transported product is nipped between the press roller and the cooling roller, and the press roller is preferably an elastic body, and is, for example, a rubber roller. However, when great importance is attached to clearance precision, the press roller is preferably a metal roll similarly to the case of the cooling roller. In contrast, the cooling roller, which cools a melt-extruded resin, is preferably metallic. It is preferable that the surface of the cooling roller has a ten-point average roughness (Rz) of 0 μm or more and 10 μm or less. When the porous film is arranged to come in contact with the cooling roller, the surface of the cooling roller preferably has a ten-point average roughness (Rz) of 0 μm or more and 3 μm or less, and more preferably 1 μm or more and 2 μm or less. When the substrate in place of the porous film is arranged to come in contact with the cooling roller, the surface of the cooling roller preferably has a ten-point average roughness (Rz) of 3 μm or more and 10 μm or less, and more preferably 3 μm or more and 7 μm or less. When the surface of the cooling roller has a ten-point average roughness (Rz) within around the range described above, the surface of the cooling roller becomes in a mirror state, whereby the concavities and convexities of the surface of the thermal transfer image-receiving sheet can be reduced to improve the texture of the print surface of the obtained thermal transfer image-receiving sheet. The ten-point average roughness (Rz) of the surface of the cooling roller is a value determined according to the standard for surface roughness defined according to JIS B0601-2001.

It is preferable that the substrate is arranged to be closer to the press roller, the porous film is arranged to be closer to the cooling roller, the die is arranged to be closer to the cooling roller than the midpoint between the press roller and the cooling roller, a resin is melt-extruded from a die, and the molten resin is passed through the portion between the press roller and the cooling rollers in the method for producing a support for a thermal transfer image-receiving sheet according to the present invention. Such a production method makes it possible to improve the adhesiveness between the substrate and the porous film without crushing the voids in the porous film and to improve the texture of the print surface of the obtained thermal transfer image-receiving sheet. The molten resin is dropped on the porous film arranged on the cooling roller in the case of arranging the die at such a position as described above. Therefore, the transportation rate (roller rate) of the cooling roller is preferably 50 m/min or more so that the porous film in itself is prevented from being deformed by the heat of the molten resin.

<Method for Producing Thermal Transfer Image-Receiving Sheet>

First Embodiment

In a first embodiment of a method for producing a thermal transfer image-receiving sheet according to the present invention, a color material-receiving layer is further layered on the porous layer of the support for a thermal transfer image-receiving sheet obtained by the production method described above. In other words, the thermal transfer image-receiving sheet obtained by the production method of the present invention comprises the substrate layer comprising the substrate, the adhesive layer comprising the melt-extruded resin, the porous layer comprising the porous film, and the color material-receiving layer that are layered in the order mentioned. The thermal transfer image-receiving sheet may further comprise a primer layer between the porous layer and the color material-receiving layer.

Second Embodiment

In a second embodiment of a method for producing a thermal transfer image-receiving sheet according to the present invention, a color material-receiving layer, or a primer layer and the color material-receiving layer are formed in advance on one side of a porous film, and a substrate and the porous film are laminated with a melt-extruded resin while passing the substrate and the porous film through a portion between a press roller and a cooling roller in a pair between which a distance d is regulated so that the other side of the porous film (the side opposite to the side on which the color material-receiving layer is formed) and the substrate face each other. Finally, the resultant is stripped from a stripping roller to obtain a thermal transfer image-receiving sheet in which a substrate layer, an adhesive layer, a porous layer, and the color material-receiving layer, or the primer layer and the color material-receiving layer that are layered have a total thickness h. The total thickness h is not necessarily a value obtained by simply adding the respective thicknesses of the substrate layer, the adhesive layer, the porous layer, and the color material-receiving layer, or the primer layer and the color material-receiving layer prior to the lamination.

Figure 2:
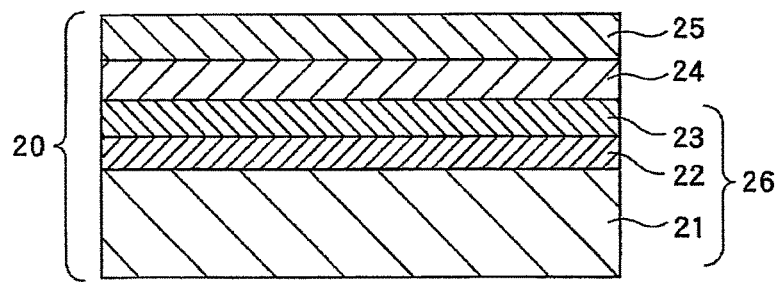
FIG. 2 is a schematic cross-sectional view illustrating one embodiment of a thermal transfer image-receiving sheet using a support for a thermal transfer image-receiving sheet obtained by the production method of the present invention.

One embodiment of the thermal transfer image-receiving sheet obtained by the production method of the present invention will be described with reference to a schematic cross-sectional view. A thermal transfer image-receiving sheet 20 illustrated in FIG. 2 comprises a primer layer 24 and a color material-receiving layer 25 that are layered in the order mentioned on a support 26 for a thermal transfer image-receiving sheet comprising a substrate layer 21, an adhesive layer 22, and a porous layer 23. Each layer included in the thermal transfer image-receiving sheet according to the present invention will be described in detail below.

(Substrate Layer)

Heat is applied to the substrate layer of the thermal transfer image-receiving sheet during thermal transfer. Therefore, it is preferable to use a material having mechanical strength of which the degree does not constitute a hindrance to handling of the substrate layer even in the state of heating the substrate layer. It is preferable to use a paper substrate as such a material of the substrate layer. It is preferable to use non-coat paper as the paper substrate, and examples thereof include base paper, photographic base paper, and premium grade paper. In the present invention, for example, base paper, photographic base paper, premium grade paper, and the like can be used. Non-coat paper or coat paper on either or both sides of which a resin layer is melt-extruded and formed can also be used. Such a manner makes it possible to produce the thermal transfer image-receiving sheet excellent in texture and in the other physical properties of the thermal transfer image-receiving sheet. For example, premium grade paper or art paper having a basis weight of 78 g/m$^2$ or more and 400 g/m$^2$ or less, preferably 100 g/m$^2$ or more and 200 g/m$^2$ or less, can be used. In the present invention, a cost can be reduced by using non-coat paper as the substrate layer, in comparison with the case of using coat paper. From the viewpoint of improving stability against the curl of a print and the texture of a print surface, the substrate layer may be formed by melt-extruding a resin layer as a backing layer on the side opposite to the side on which a porous film is laminated. The resin is preferably polyolefin resin having a melting point of 100° C. or more, measured according to JIS K7121, and still more preferably polyolefin resin having a melting point of 120° C. or more. The polyolefin resin preferably has a density of 0.90 g/cm$^3$ or more and 0.95 g/cm$^3$ or less, measured according to JIS K6760.

The thickness of the substrate layer is not particularly limited, and is preferably 50 μm or more and 300 μm or less, more preferably 100 μm or more and 250 μm or less, and still more preferably 130 μm or more and 175 μm or less. Adhesiveness between the substrate and the porous film can be improved without crushing voids in the porous film and the texture of the print surface of the obtained thermal transfer image-receiving sheet can be improved as long as the thickness of the substrate layer is within the range described above.

(Adhesive Layer)

The adhesive layer of the thermal transfer image-receiving sheet is disposed in order to allow the substrate layer and the porous layer to adhere to each other, and is formed of the resin melt-extruded by the production method according to the present invention. It is preferable that the resin used for forming the adhesive layer is thermoplastic resin. Specific examples of the thermoplastic resin that can be used include low-density polyethylene resins, medium-density polyethylene resins, high-density polyethylene resins, linear low-density polyethylene resins, copolymer resins with ethylene/α-olefin polymerized by using metallocene catalysts, ethylene/polypropylene copolymer resins, ethylene/vinyl acetate copolymer resins, ethylene/acrylic acid copolymer resins, ethylene/ethyl acrylate copolymer resins, ethylene/methacrylic acid copolymer resins, ethylene/methyl methacrylate copolymer resins, ethylene/maleic acid copolymer resins, ionomer resins, resins obtained by graft polymerization or copolymerization of polyolefin resins with unsaturated carboxylic acids, unsaturated carboxylic acids, unsaturated carboxylic acid anhydrides, and ester monomers, and resins obtained by graft modification of polyolefin resins with maleic anhydride. These materials may be used singly or in combination of two or more kinds thereof.

In an aspect of the present invention, a melt-extruded resin is preferably polyolefin resin having a melting point of 100° C. or more, measured according to JIS K7121, and is still more preferably polyolefin resin having a melting point of 120° C. or more in view of improving the texture of a print surface of pan obtained thermal transfer image-receiving sheet. It is preferable that the polyolefin resin has a density of 0.93 g/cm$^3$ or less, preferably 0.90 g/cm$^3$ or more and 0.93 g/cm$^3$ or less, and more preferably 0.915 g/cm$^3$ or more and 0.925 g/cm$^3$ or less, measured according to JIS K6760, from the viewpoint of improving stability against the curl of a print and the texture of a print surface.

(Porous Layer)

The porous layer of the thermal transfer image-receiving sheet comprises a porous film. The thickness of the porous film is preferably 10 μm or more and 100 μm or less, more preferably 15 μm or more and 80 μm or less, and still more preferably 20 μm or more and 50 μm or less. The porous film preferably has a density of 0.1 g/cm$^3$ or more and 1.5 g/cm$^3$ or less, and still more preferably 0.3 g/cm$^3$ or more and 1.0 g/cm$^3$ or less, measured according to JIS K6922. The porous film is preferably a porous film which contains polypropylene resin as a resin as a base, and of which the interior contains fine voids. The adhesiveness between the substrate and the porous film can be improved without crushing the voids in the porous film and the texture of the print surface of the obtained thermal transfer image-receiving sheet can be improved by disposing the porous layer comprising the porous film having a thickness in a range equivalent to the above-described range and containing polypropylene resin.

In a method of generating the fine voids in the film, a compound is produced by kneading organic fine particles or inorganic fine particles (of which the kinds may be one or more) immiscible with the resin as the base of the film. Microscopic observation of the compound reveals that the resin as the base and fine particles immiscible with the resin as the base form a fine sea-island structure. The compound is made into a film, which is stretched, whereby a sea-island interface is peeled or an area in which an island is formed is greatly deformed, thereby generating such fine voids as described above.

Examples of the method of forming the fine voids include a method of adding polyester or acrylic resin of which the melting is higher than that of polypropylene to polypropylene as a base. In this case, the polyester or the acrylic resin serves as a nucleating agent for forming fine voids. In any case, the content of the polyester or the acrylic resin is preferably 2 parts by mass or more and 10 parts by mass or less with respect to 100 parts by mass of polypropylene. When the content is 2 parts by mass or more, the fine voids can be sufficiently generated, and printing sensitivity can be further improved. When the content is 10 parts by mass or less, the heat resistance of the porous film can be sufficiently secured.

It is preferable to further add polyisoprene in order to generate more voids that are fine and minute when the porous film in which the resin as the base is polypropylene is formed. As a result, higher printing sensitivity can be obtained. For example, a compound is produced by blending acrylic resin or polyester, and polyisoprene with polypropylene as a base and is made into a film, which is stretched, whereby the porous film having high printing sensitivity can be obtained.

(Color Material-Receiving Layer)

The color material-receiving layer of the thermal transfer image-receiving sheet is intended to receive a sublimating dye shifting from a thermal transfer ink sheet and to maintain a formed image. Examples of resins for forming the color material-receiving layer include polycarbonate resins, polyester resins, polyamide resins, acrylic resins, cellulosic resins, polysulfone resins, polyvinyl chloride resin, polyvinyl acetate resin, vinyl chloride-vinyl acetate copolymer resin, polyvinyl acetal resin, polyvinyl butyral resin, polyurethane resins, polystyrene resins, polypropylene resins, polyethylene resins, ethylene-vinyl acetate copolymer resin, and epoxy resin.

In the thermal transfer image-receiving sheet, a mold release agent can be contained in the color material-receiving layer in order to improve releasability from the thermal transfer ink sheet. Examples of the mold release agent include: solid waxes such as polyethylene wax, amide wax, and Teflon (registered trademark) powder; fluorine- or phosphate ester-based surfactants; various modified silicone oils such as silicone oils, reactive silicone oils, and curable silicone oils; and various silicone resins. Such a silicone oil is preferred as the mold release agent. As the silicone oils described above, oily silicone oils can be used, and modified silicone oils are preferred. As the modified silicone oils, amino-modified silicone, epoxy-modified silicone, aralkyl-modified silicone, epoxy-aralkyl-modified silicone, alcohol-modified silicone, vinyl-modified silicone, urethane-modified silicone, and the like can be preferably used, and epoxy-modified silicone, aralkyl-modified silicone, and epoxy-aralkyl-modified silicone are particularly preferred. It is also preferable to use the mold release agents in combination of two or more kinds thereof. It is preferable that the amount of each of the added modified silicone oils is 0.5 mass % or more and 30 mass % or less of the resin included in the color material-receiving layer.

When the color material-receiving layer is formed, pigments and fillers, such as titanium oxide, zinc oxide, kaoline, clay, calcium carbonate, and fine powder silica, can be added for the purpose of improving the whiteness of the color material-receiving layer to further enhance the sharpness of a transferred image. Plasticizers such as phthalic acid ester compounds, sebacic acid ester compounds, and phosphoric acid ester compounds may be added.

The color material-receiving layer can be formed by applying and drying a coating liquid, obtained by dissolving or dispersing a thermoplastic resin and another needed additive, for example, a mold release agent, a plasticizer, a filler, a crosslinking agent, a curing agent, a catalyst, a heat mold release agent, an ultraviolet absorbing agent, an antioxidant, a light stabilizer, or the like in an organic solvent or water, by formation means such as, for example, a gravure printing method, a screen printing method, or a reverse roll coating method using a photogravure. The amount of the applied color material-receiving layer formed in such a manner is typically around 0.5 g/m$^2$ or more and 50 g/m$^2$ or less and preferably 2 g/m$^2$ or more and 10 g/m$^2$ or less in a dry state. Such a color material-receiving layer is preferably formed by continuous coating or may be formed by discontinuous coating.

(Mold Release Layer)

The thermal transfer image-receiving sheet may further comprise a mold release layer on at least a part of a surface of the color material-receiving layer. The mold release layer can be formed by dissolving or dispersing the mold release agent described above in an appropriate solvent, and applying and drying the resultant. The mold release agent used for the mold release layer is not particularly limited but is preferably a cured reaction product of amino-modified silicone oil and epoxy-modified silicone oil. The thickness of the mold release agent layer is preferably 0.01 μm or more and 5.0 μm or less, and more preferably 0.05 μm or more and 2.0 μm or less. In the case of forming the color material-receiving layer, addition of silicone oil to form the color material-receiving layer enables the mold release layer to be formed even in the case of curing the silicone oil bleeding out on the surface after the application. When the color material-receiving layer is formed, pigments and fillers, such as titanium oxide, zinc oxide, kaoline, clay, calcium carbonate, and fine powder silica, can be added for the purpose of improving the whiteness of the color material-receiving layer to further enhance the sharpness of a transferred image. Plasticizers such as phthalic acid ester compounds, sebacic acid ester compounds, and phosphoric acid ester compounds may be added.

(Primer Layer)

The primer layer of the thermal transfer image-receiving sheet is disposed between the color material-receiving layer and the porous layer and is directed to impart adhesiveness between the color material-receiving layer and the porous film, whiteness, cushioning properties, a concealment ability, antistatic properties, curl prevention properties, and the like. In the present invention, any conventionally known primer layer can be disposed. Examples of a binder resin used for the primer layer include polyurethane resins, polyester resins, polycarbonate resins, polyamide resins, acrylic resins, polystyrene resins, polysulfone resins, polyvinyl chloride resins, polyvinyl acetate resins, vinyl chloride-vinyl acetate copolymer resin, polyvinyl acetal resin, polyvinyl butyral resin, polyvinyl alcohol resin, epoxy resin, cellulosic resins, ethylene-vinyl acetate copolymer resin, polyethylene resins, and polypropylene resins. Of these resins, cured isocyanate products of the resins having an active hydroxyl group can be further used as binders.

It is preferable to add a filler such as titanium oxide, zinc oxide, magnesium carbonate, or calcium carbonate in order to impart whiteness and a concealment ability. Further, a stilbene compound, a benzimidazole compound, a benzoxazole compound, or the like can be added as a fluorescent whitening agent in order to enhance whiteness, a hindered amine compound, a hindered phenol compound, a benzotriazole compound, a benzophenone compound, or the like can be added as an ultraviolet absorbing agent or an antioxidant in order to enhance the light resistance of a print, or cationic acrylic resin, polyaniline resin, various conductive fillers, or the like can be added in order to impart antistatic properties. It is preferable that the amount of the applied primer layer is around 0.5 g/m$^2$ or more and 5 g/m$^2$ or less in a dry state. The primer layer and the like may be applied by a method similar to the means for forming of the color material-receiving layer.

<Thermal Transfer Ink Sheet>

It is preferable that the thermal transfer ink sheet used together with the thermal transfer image-receiving sheet obtained by the production method of the present invention has a layer configuration in which a thermal transfer color material layer is disposed on one side of the substrate sheet and a heat-resistant slipping layer is disposed on the other side of the substrate sheet. Each layer included in the thermal transfer ink sheet will be described below.

(Substrate Sheet)

As the material of the substrate sheet included in the thermal transfer ink sheet, a conventionally known material can be used, or otherwise a material having certain heat resistance and strength can be used. Examples thereof include resin films such as polyethylene terephthalate, polyester, polypropylene, polycarbonate, polyethylene, polystyrene, polyvinyl alcohol, polyvinyl chloride, polyvinylidene chloride, polyimide, nylon, cellulose acetate, and ionomer; papers such as condenser paper and paraffin paper; and non-woven fabrics. They may be used singly or a layered product in which they are optionally combined may be used. Of these, polyethylene terephthalate which is a general-purpose plastic that can be thinned and is inexpensive is preferable.

The thickness of the substrate sheet can be selected as appropriate depending on a material so that strength, heat resistance, and the like are appropriate. Typically, the thickness is preferably around 0.5 μm or more and 50 μm or less, more preferably 1 μm or more and 20 μm or less, and still more preferably 1 μm or more and 10 μm or less.

The substrate sheet may be subjected to surface treatment in order to improve adhesiveness with an adjacent layer. A known resin surface modification technology such as corona discharge treatment, flame treatment, ozone treatment, ultraviolet treatment, radiation treatment, roughening treatment, chemical treatment, plasma treatment, or grafting treatment can be used as the surface treatment described above. Only one kind or two or more kinds of the surface treatments described above may be performed.

Further, it is also possible to form an adhesive layer by application on the substrate sheet in adhesion treatment of the substrate sheet described above. The adhesive layer can be formed of, for example, the following organic materials and inorganic materials. Examples of the organic materials described above include vinyl resins such as polyester resins, polyacrylic acid ester resins, polyvinyl acetate resins, polyurethane resins, styrene acrylate resins, polyacrylamide resins, polyamide resins, polyether resins, polystyrene resins, polyethylene resins, polypropylene resins, polyvinyl chloride resin, polyvinyl alcohol resin, polyvinylpyrrolidone, and modified products thereof; and polyvinyl acetal resins such as polyvinyl acetoacetal and polyvinyl butyral. Examples of the inorganic materials described above include colloidal inorganic pigment ultrafine particles such as silica (colloidal silica), alumina or hydrated alumina (alumina sol, colloidal alumina, cationic aluminum oxide or hydrates thereof, pseudoboehmite, and the like), aluminum silicate, magnesium silicate, magnesium carbonate, magnesium oxide, and titanium oxide.

When a plastic film is produced by being subjected to stretching treatment as the surface treatment described above, the production can also be performed by applying a primer liquid to an unstretched film and then performing stretching treatment (primer treatment).

(Thermal Transfer Color Material Layer)

In the thermal transfer ink sheet, the thermal transfer color material layer is disposed on one side of the substrate sheet. A layer containing a sublimation dye is formed as the thermal transfer color material layer when the thermal transfer ink sheet is a sublimation thermal transfer ink sheet, while a layer containing a thermal melting ink comprising a thermal melting composition containing a coloring agent is formed when the thermal transfer ink sheet is a thermal melting thermal transfer ink sheet. A layer region containing a sublimation dye and a layer region containing a thermal melting ink comprising a thermal melting composition containing a coloring agent may be plane-sequentially disposed on one continuous substrate sheet.

As the material of the thermal transfer color material layer, a conventionally known dye can be used, and a material that has properties favorable as a print material, for example, has sufficient coloring concentration and is prevented from being discolored due to light, heat, temperature, and the like is preferable. Examples thereof include diarylmethane dyes, triarylmethane dyes, thiazole dyes, merocyanine dyes, pyrazolone dyes, methine dyes, indoaniline dyes, azomethine dyes such as acetophenoneazomethine, pyrazoloazomethine, imidazoleazomethine, imidazoazomethine, and pyridoneazomethine, xanthene dyes, oxazine dyes, cyanostyrene dyes such as dicyanostyrene and tricyanostyrene, thiazine dyes, azine dyes, acridine dyes, benzene azo dyes, azo dyes such as pyridone azo, thiophene azo, isothiazole azo, pyrrole azo, pyrazole azo, imidazole azo, thiadiazole azo, triazole azo, and disazo, spiropyran dyes, indolinospiropyran dyes, fluorane dyes, rhodamine lactam dyes, naphthoquinone dyes, anthraquinone dyes, and quinophthalone dyes. Specific examples thereof include red dyes such as Disperse Red 60, Disperse Violet 26, Ceres Red 7B, and Samaron Red F3BS, yellow dyes such as Disperse Yellow 231, PTY-52, and Macrolex Yellow 6G, and blue dyes such as Solvent Blue 63, Waxoline Blue AP-FW, Holon Brilliant Blue S-R, MS Blue 100, and C.I. Solvent Blue 22. In addition, a dye contained in a commercially available ribbon used in a sublimation thermal transfer system can also be used.

Examples of binder resins for supporting the dyes described above include cellulosic resins such as ethylcellulose resin, hydroxyethyl cellulose resin, ethyl hydroxy cellulose resin, methyl cellulose resin, and cellulose acetate resin, vinyl resins such as polyvinyl alcohol resin, polyvinyl acetate resin, polyvinyl butyral resin, polyvinyl acetal resin, and polyvinylpyrrolidone, acrylic resins such as poly(meth) acrylate and poly(meth)acrylamide, polyurethane resins, polyamide resins, and polyester resins. Of these, resins such as cellulosic resins, vinyl resins, acrylic resins, polyurethane resins, and polyester resins are preferred in view of heat resistance and the transferability of a dye.

Examples of a method for forming a thermal transfer color material layer include the following method. The thermal transfer color material layer can be formed by optionally adding an additive such as a mold release agent to the dye and binder resin described above, dissolving the resultant in an appropriate organic solvent such as toluene or methyl ethyl ketone or dispersing the resultant in water, and applying and drying the obtained application liquid for a thermal transfer color material layer (solution or dispersion liquid) to one side of the substrate sheet by formation means such as, for example, a gravure printing method, a reverse roll coating method using a photogravure, a roll coater, or a bar coater. It is preferable that the thickness of the thermal transfer color material layer is around 0.2 μm or more and 5.0 μm or less, and the content of the sublimation dye in the thermal transfer color material layer is 5 mass % or more and 90 mass % or less, preferably 5 mass % or more and 70 mass % or less.

(Protecting Layer)

In the thermal transfer ink sheet, a protecting layer may be plane-sequentially disposed on the same plane as that of the thermal transfer color material layer. A color material is transferred to the thermal transfer image-receiving sheet, and the protecting layer is then transferred to perform coating of an image, whereby the image can be protected from light, gas, liquid, a scratch, and the like. It is also acceptable that another layer such as an adhesive layer, a peeling layer, or an undercoating layer is disposed as the protecting layer.

(Heat-Resistant Slipping Layer)

The heat-resistant slipping layer primarily comprises a heat-resistant resin. Examples of the heat-resistant resin include, but are not particularly limited to, polyvinyl butyral resin, polyvinyl acetoacetal resin, polyester resin, vinyl chloride-vinyl acetate copolymer resin, polyether resin, polybutadiene resin, styrene-butadiene copolymer resin, acrylic polyol, polyurethane acrylate, polyester acrylate, polyether acrylate, epoxy acrylate, a urethane or epoxy prepolymer, nitrocellulose resin, cellulose nitrate resin, cellulose acetate propionate resin, cellulose acetate butyrate resin, cellulose acetate-hydrodiene phthalate resin, cellulose acetate resin, aromatic polyamide resin, polyimide resin, polyamide-imide resin, polycarbonate resin, and chlorinated polyolefin resin.

The heat-resistant slipping layer may be formed by being blended with an additive such as an agent for imparting lubricity, a crosslinking agent, a mold release agent, an organic powder, or an inorganic powder as well as the above heat-resistant resin described above.

The heat-resistant slipping layer can also be commonly formed by adding the above-described heat-resistant resin as well as the above-described agent for imparting lubricity and additive added as desired into a solvent, dissolving or dispersing each component to prepare a heat-resistant slipping layer application liquid, and then applying and drying the heat-resistant slipping layer application liquid onto a substrate. A solvent similar to the solvent in the above-described dye ink can be used as the solvent in the above-described heat-resistant slipping layer application liquid.

Examples of a method of applying a heat-resistant slipping layer application liquid include wire bar coating, gravure printing method, screen printing method, and reverse roll coating method using a photogravure. Especially, gravure coating is preferable. The heat-resistant slipping layer application liquid is preferably applied so as to have a dry application amount of preferably 0.1 g/m² or more and 3 g/m² or less, and more preferably 1.5 g/m² or less.

<Image Formation Method>

In an image formation method using the thermal transfer image-receiving sheet obtained by the production method according to the present invention, an image can be formed by transferring a thermally diffusive coloring matter contained in a thermal transfer ink sheet to the thermal transfer image-receiving sheet by overlapping the thermal transfer image-receiving sheet and the thermal transfer ink sheet containing the thermally diffusive coloring matter and heating them depending on a recorded signal. In the present invention, an image can also be formed by high-speed printing. The high-speed printing is performed at 0.5 msec/line or more and 3.0 msec/line or less.

Known thermal transfer recording apparatuses can be used in such an image formation method, without particular limitation. In the present invention, a commercially available thermal transfer recording apparatus can be used, and examples thereof include a sublimation thermal transfer printer ((model: MEGAPIXEL III) manufactured by ALTECH ADS Corporation, (model: DS40) manufactured by DNP FOTOLUSIO)).

EXAMPLES

The present invention will be described in more detail below with reference to Examples and Comparative Examples, but the present invention is not intended to be interpreted with limitation to the following Examples.

<Production of Support for Thermal Transfer Image-Receiving Sheet>

Example 1

White base paper (non-coat paper, thickness of 150 μm, manufactured by (Mitsubishi Paper Mills Limited)) as a paper substrate was prepared as a substrate layer, and a porous polypropylene film (thickness of 38 μm, density of 0.7 g/cm³) was prepared as a porous film forming a porous layer. An apparatus comprising a press roller and a cooling roller (surface ten-point average roughness (Rz): 2 μm) in a pair as illustrated in FIG. 1 was prepared, and a distance d which was a spacing between the rollers in the pair was regulated to 170 μm. Then, the paper substrate was arranged to be closer to the press roller, the porous polypropylene film was arranged to be closer to the cooling roller, a die was arranged at a position 5 mm closer to the cooling roller than a position corresponding to the midpoint of the spacing d, and the paper substrate and the porous polypropylene film were laminated with a melt-extruded polyethylene resin (melting point: 107° C., measured according to JIS K7121, density: 0.919 g/cm³) while passing the paper substrate and the porous polypropylene film through a portion between the rollers in the pair, thereby obtaining a support for a thermal transfer image-receiving sheet. The thickness of an adhesive layer comprising the melt-extruded and dropped polyethylene resin was 15 μm.

<Production of Thermal Transfer Image-Receiving Sheet>

Subsequently, a coating liquid for a primer layer having the following composition was applied onto the porous polypropylene film of the obtained support for a thermal transfer image-receiving sheet by a gravure coater so that the dried liquid was 2 g/m². The coating liquid was dried at 110° C. for 1 minute and a coating liquid for a color material-receiving layer having the following composition was then applied thereon by the gravure coater so that the dried liquid was 4 g/m². The coating liquid was dried at 110° C. for 1 minute to form a primer layer and a color material-receiving layer to obtain a thermal transfer image-receiving sheet.

(Composition of Coating Liquid for Primer Layer)

| | |
|---|---|
| Polyester resin (trade name: WR-905, manufactured by The Nippon Synthetic Chemical Industry Co., Ltd.) | 13.1 parts by mass |
| Titanium oxide (trade name: TCA-888, manufactured by TOHKEM PRODUCTS CORPORATION) | 26.2 parts by mass |
| Fluorescent whitening agent (benzimidazole derivative, trade name: UVITEX BAC, manufactured by Ciba Specialty Chemicals Inc.) | 0.39 part by mass |
| Water/isopropyl alcohol [IPA] (mass ratio of 2/1) | 60 parts by mass |

(Composition of Coating Liquid for Color Material-Receiving Layer)

| | |
|---|---|
| Vinyl chloride-vinyl acetate copolymer (trade name: Solbine C, manufactured by Nissin Chemical Industry Co., Ltd.) | 60 parts by mass |
| Epoxy-modified silicone (trade name: X-22-3000T, manufactured by Shin-Etsu Chemical Co., Ltd.) | 1.2 parts by mass |
| Methylstyryl-modified silicone (trade name: 24-510, manufactured by Shin-Etsu Chemical Co., Ltd.) | 0.6 part by mass |
| Methyl ethyl ketone/toluene (mass ratio of 1/1) | 5 parts by mass |

Example 2

A support for a thermal transfer image-receiving sheet was produced in the same manner as that in Example 1 except that the thickness of the adhesive layer comprising the melt-extruded polyethylene resin was changed to 25 µm. Subsequently, a thermal transfer image-receiving sheet was produced in the same manner as in Example 1.

Example 3

A support for a thermal transfer image-receiving sheet was produced in the same manner as that in Example 1 except that the thickness of the adhesive layer comprising the melt-extruded polyethylene resin was changed to 35 µm. Subsequently, a thermal transfer image-receiving sheet was produced in the same manner as in Example 1.

Example 4

A support for a thermal transfer image-receiving sheet was produced in the same manner as that in Example 1 except that the distance d which was the spacing between the rollers in the pair was changed to 200 µm. Subsequently, a thermal transfer image-receiving sheet was produced in the same manner as in Example 1.

Example 5

A support for a thermal transfer image-receiving sheet was produced in the same manner as that in Example 2 except that the distance d which was the spacing between the rollers in the pair was changed to 200 µm. Subsequently, a thermal transfer image-receiving sheet was produced in the same manner as in Example 2.

Example 6

A support for a thermal transfer image-receiving sheet was produced in the same manner as that in Example 3 except that the distance d which was the spacing between the rollers in the pair was changed to 200 µm. Subsequently, a thermal transfer image-receiving sheet was produced in the same manner as in Example 3.

Example 7

A support for a thermal transfer image-receiving sheet was produced in the same manner as that in Example 1 except that the distance d which was the spacing between the rollers in the pair was changed to 230 µm. Subsequently, a thermal transfer image-receiving sheet was produced in the same manner as in Example 1.

Example 8

A support for a thermal transfer image-receiving sheet was produced in the same manner as that in Example 2 except that the distance d which was the spacing between the rollers in the pair was changed to 230 µm. Subsequently, a thermal transfer image-receiving sheet was produced in the same manner as in Example 2.

Example 9

A support for a thermal transfer image-receiving sheet was produced in the same manner as that in Example 3 except that the distance d which was the spacing between the rollers in the pair was changed to 230 µm. Subsequently, a thermal transfer image-receiving sheet was produced in the same manner as in Example 3.

Example 10

A support for a thermal transfer image-receiving sheet was produced in the same manner as that in Example 4 except that the thickness of the adhesive layer comprising the melt-extruded polyethylene resin was changed to 10 µm. Subsequently, a thermal transfer image-receiving sheet was produced in the same manner as in Example 4.

Example 11

A thermal transfer image-receiving sheet was produced in the same manner as that in Example 1 except that a porous polypropylene film on which a primer layer and a color material-receiving layer were formed in advance under the above-described conditions was used instead of using the porous polypropylene film on an as-is basis.

Example 12

Corona treatment of one side of the paper substrate was performed at 20 w/m²·min, and polyethylene resin (melting point of 120° C., measured according to JIS K7121, density of 0.93 g/cm³, measured according to JIS K6760) was melt-extruded onto the side so as to have a thickness of 20 µm, to form a backing layer. A support for a thermal transfer image-receiving sheet was produced in the same manner as that in Example 1 except that a paper substrate on one side of which the backing layer was formed in advance was used instead of using the paper substrate on an as-is basis, and that the other side of the paper substrate (the side opposite to the side on which the backing layer was formed) and the porous film were laminated. Subsequently, a thermal transfer image-receiving sheet was produced in the same manner as that in Example 1.

Example 13

A support for a thermal transfer image-receiving sheet was produced in the same manner as that in Example 1 except that corona treatment of one side of a paper substrate was performed at 20 w/m²·min, and that polyethylene resin was melt-extruded and dropped on the side. Subsequently, a thermal transfer image-receiving sheet was produced in the same manner as that in Example 1.

Example 14

A support for a thermal transfer image-receiving sheet was produced in the same manner as that in Example 1 except that the die was arranged at a position 20 mm closer to the press roller than the position corresponding to the midpoint of the spacing d. Subsequently, a thermal transfer image-receiving sheet was produced in the same manner as that in Example 1.

Example 15

A support for a thermal transfer image-receiving sheet was produced in the same manner as that in Example 1 except that the die was arranged at a position 10 mm closer to the cooling roller than the position corresponding to the midpoint of the spacing d. Subsequently, a thermal transfer image-receiving sheet was produced in the same manner as that in Example 1.

Example 16

A support for a thermal transfer image-receiving sheet was produced in the same manner as that in Example 1 except that the die was arranged at the position corresponding to the midpoint of the spacing d. Subsequently, a thermal transfer image-receiving sheet was produced in the same manner as that in Example 1.

Comparative Example 1

A support for a thermal transfer image-receiving sheet was produced in the same manner as that in Example 1 except that the distance d which was the spacing between the rollers in the pair was changed to 0 μm. Subsequently, a thermal transfer image-receiving sheet was produced in the same manner as that in Example 1.

Comparative Example 2

A support for a thermal transfer image-receiving sheet was produced in the same manner as that in Example 2 except that the distance d which was the spacing between the rollers in the pair was changed to 0 μm. Subsequently, a thermal transfer image-receiving sheet was produced in the same manner as that in Example 2.

Comparative Example 3

A support for a thermal transfer image-receiving sheet was produced in the same manner as that in Example 3 except that the distance d which was the spacing between the rollers in the pair was changed to 0 μm. Subsequently, a thermal transfer image-receiving sheet was produced in the same manner as that in Example 3.

Comparative Example 4

A support for a thermal transfer image-receiving sheet was produced in the same manner as that in Example 1 except that the distance d which was the spacing between the rollers in the pair was changed to 300 μm. Subsequently, a thermal transfer image-receiving sheet was produced in the same manner as that in Example 1.

Comparative Example 5

A support for a thermal transfer image-receiving sheet was produced in the same manner as that in Example 2 except that the distance d which was the spacing between the rollers in the pair was changed to 300 μm. Subsequently, a thermal transfer image-receiving sheet was produced in the same manner as that in Example 1.

Comparative Example 6

A support for a thermal transfer image-receiving sheet was produced in the same manner as that in Example 3 except that the distance d which was the spacing between the rollers in the pair was changed to 300 μm. Subsequently, a thermal transfer image-receiving sheet was produced in the same manner as that in Example 3.

The distance d which is the spacing between the rollers in the pair, the thickness of the adhesive layer, the total thickness h of the substrate layer, the adhesive layer, and the porous layer, and the difference between the distance d and the total thickness h, of each of the Examples and Comparative Examples described above, are shown in Table 1.

TABLE 1

| | Distance d | Thickness of Adhesive Layer | Total Thickness h | Difference between Distance d and Total Thickness h |
|---|---|---|---|---|
| Example 1 | 170 | 15 | 190 | −20 |
| Example 2 | 170 | 25 | 200 | −30 |
| Example 3 | 170 | 35 | 210 | −40 |
| Example 4 | 200 | 15 | 190 | 10 |
| Example 5 | 200 | 25 | 200 | 0 |
| Example 6 | 200 | 35 | 210 | −10 |
| Example 7 | 230 | 15 | 190 | 40 |
| Example 8 | 230 | 25 | 200 | 30 |
| Example 9 | 230 | 35 | 210 | 20 |
| Example 10 | 200 | 10 | 185 | 15 |
| Example 11 | 170 | 15 | 196 | −26 |
| Example 12 | 170 | 15 | 210 | −40 |
| Example 13 | 170 | 15 | 190 | −20 |
| Example 14 | 170 | 15 | 190 | −20 |
| Example 15 | 170 | 15 | 190 | −20 |
| Example 16 | 170 | 15 | 190 | −20 |
| Comparative Example 1 | 0 | 15 | 190 | −190 |
| Comparative Example 2 | 0 | 25 | 200 | −200 |
| Comparative Example 3 | 0 | 35 | 210 | −210 |
| Comparative Example 4 | 300 | 15 | 190 | 110 |
| Comparative Example 5 | 300 | 25 | 200 | 100 |
| Comparative Example 6 | 300 | 35 | 210 | 90 |

<Production of Thermal Transfer Ink Sheet>

A polyethylene terephthalate film with a thickness of 4.5 μm subjected to adhesion-enhancing treatment was used as a substrate sheet, an application liquid for a heat-resistant slipping layer having the following composition was applied onto the film so that the dried liquid was 0.8 g/m², to form a heat-resistant slipping layer.

(Composition of Application Liquid for Heat-Resistant Slipping Layer)

| | |
|---|---|
| Polyvinyl acetal (trade name: S-LEC KS-1, manufactured by SEKISUI CHEMICAL CO., LTD.) | 60.6 parts by mass |
| Polyisocyanate (trade name: BURNOCK D750, manufactured by Dainippon Ink And Chemicals, Inc.) | 8.4 parts by mass |
| Silicone resin fine particles (trade name: TOSPEARL 240, manufactured by Momentive Performance Materials Japan LLC, average particle diameter of 4 μm, polygonal) | 1 part by mass |
| Zinc stearyl phosphate (LBT-1830 purified, manufactured by Sakai Chemical Industry Co., Ltd.) | 10 parts by mass |
| Zinc stearate (SZ-PF, manufactured by Sakai Chemical Industry Co., Ltd.) | 10 parts by mass |
| Polyethylene wax (POLYWAX 3000, manufactured by Toyo Petrolite Co., Ltd.) | 3 parts by mass |
| Ethoxylated alcohol-modified wax (trade name: UNITOX 750, manufactured by TOYO ADL CORPORATION) | 7 parts by mass |
| Methyl ethyl ketone | 200 parts by mass |
| Toluene | 100 parts by mass |

Then, an application liquid for a primer layer having the following composition is applied to a part of the side of the substrate opposite to the side on which the heat-resistant slipping layer was disposed, so that the dry application amount of the liquid was $0.10 \text{ g/m}^2$, and the liquid was dried to form a primer layer. Subsequently, an application liquid for a yellow color material layer, an application liquid for a magenta color material layer, and an application liquid for a cyan color material layer having the following compositions were repeatedly plane-sequentially applied in the order mentioned onto the primer layer so that the dried liquids were $0.6 \text{ g/m}^2$, and the liquids were dried to form a yellow color material layer, a magenta color material layer, and a cyan color material layer.

(Application Liquid for Primer Layer)

| | |
|---|---|
| Polyvinyl pyrrolidone resin (trade name: K-90, manufactured by ISP Corporation) | 3 parts by mass |
| Alumina sol (average primary particle diameter of 10 × 100 nm, solid content of 10%, trade name: ALUMINA SOL 200, manufactured by Nissan Chemical Industries, Ltd.) | 30 parts by mass |
| Water | 50 parts by mass |
| IPA (isopropyl alcohol) | 17 parts by mass |

(Composition for Application Liquid for Yellow Color Material Layer)

| | |
|---|---|
| Disperse dye (Disperse Yellow 201) | 2.5 parts by mass |
| Disperse dye (yellow dye represented by the following chemical formula) | 2.5 parts by mass |

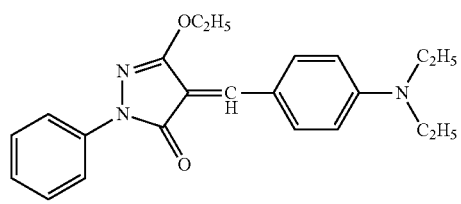 [SMILES: CCOC1=NN(c2ccccc2)C(=O)C1=Cc1ccc(N(CC)CC)cc1]

| | |
|---|---|
| Binder resin (polyvinyl acetal resin, KS-5, manufactured by SEKISUI CHEMICAL CO., LTD.) | 4.5 parts by mass |
| Polyethylene wax | 0.1 part by mass |
| Methyl ethyl ketone | 45.0 parts by mass |
| Toluene | 45.0 parts by mass |

(Composition of Application Liquid for Magenta Color Material Layer)

| | |
|---|---|
| Dye represented by the following chemical formula | 2.0 parts by mass |

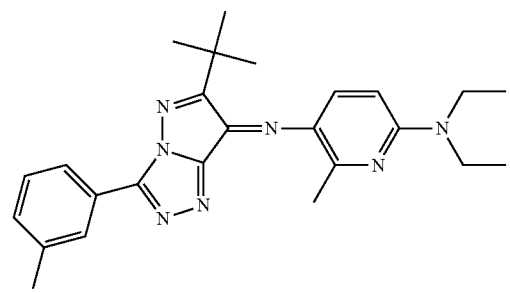 [SMILES: CCN(CC)c1ccc(N=C2C(C(C)(C)C)=Nn3c2nnc3-c2cccc(C)c2)c(C)n1]

| | |
|---|---|
| Binder resin (polyvinyl acetal resin, KS-5, manufactured by SEKISUI CHEMICAL CO., LTD.) | 4.5 parts by mass |
| Alkyl-modified silicone oil (KF-412, manufactured by Shin-Etsu Silicone Co., Ltd.) | 0.1 part by mass |
| Polyethylene wax | 0.1 part by mass |
| Methyl ethyl ketone | 45.0 parts by mass |
| Toluene | 45.0 parts by mass |

(Composition of Application Liquid for Cyan Color Material Layer)

| | |
|---|---|
| Dye represented by the following chemical formula | 2.0 parts by mass |

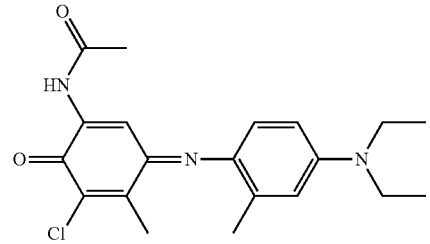 [SMILES: CCN(CC)c1ccc(N=C2C=C(NC(C)=O)C(=O)C(Cl)=C2C)c(C)c1]

| | |
|---|---|
| Binder resin (polyvinyl acetal resin, KS-5, manufactured by SEKISUI CHEMICAL CO., LTD.) | 4.5 parts by mass |

-continued

| | |
|---|---|
| Alkyl-modified silicone oil (KF-412, manufactured by Shin-Etsu Silicone Co., Ltd.) | 0.1 part by mass |
| Polyethylene wax | 0.1 part by mass |
| Methyl ethyl ketone | 45.0 parts by mass |
| Toluene | 45.0 parts by mass |

An application liquid for a protecting layer having the following composition was applied to another part of the side other than the side on which the heat-resistant slipping layer of the substrate sheet so that the dried liquid was 1.5 g/m², and the liquid was dried and formed. As a result, the thermal transfer ink sheet in which the heat-resistant slipping layer was disposed on the one side of the substrate, the primer layer and the thermal transfer color material layers (Y, M, and C) were layered on the part of the other side of the substrate in the order mentioned, and the protecting layer was disposed on the other part of the other side of the substrate was obtained.

(Composition of Application Liquid for Protecting Layer)

| | |
|---|---|
| Acrylic resin (trade name: DIANAL BR-83, manufactured by Mitsubishi Rayon Co., Ltd.) | 69.6 parts by mass |
| Acrylic copolymer to which reactive ultraviolet absorbing agent reaction-binds (trade name: UVA 635L, manufactured by BASF Japan Ltd.) | 17.4 parts by mass |
| Silica (trade name: SYLYSIA 310, manufactured by Fuji Silysia Chemical Ltd.) | 25 parts by mass |
| Methyl ethyl ketone | 100 parts by mass |
| Toluene | 100 parts by mass |

<Evaluation of Thermal Transfer Image-Receiving Sheet>

The (1) texture and (2) adhesiveness of each of the thermal transfer image-receiving sheets produced in the Examples and Comparative Examples described above were evaluated.

(1) Evaluation of Texture

Images with a gray hue having a gradation value of 50/255 (highlight images) were printed using the thermal transfer image-receiving sheets produced in the Examples and Comparative Examples described above, the thermal transfer ink sheets produced as described above, and a sublimation thermal transfer printer (model: MEGAPIXEL III, manufactured by ALTECH ADS Co., Ltd.), and the textures thereof were evaluated by visual observation based on the following evaluation criteria.

(Evaluation Criteria)

⊚: A gray highlight image area was uniform, no dispersion of fibers of the paper core material of an undercoat was observed in a surface state, and excellent smoothness, quality, and feeling equivalent to those of photographic paper reproducing full-color silver halide photography were achieved.

○: A gray highlight image area was uniform, no dispersion of fibers of the paper core material of an undercoat was observed in a surface state, and smoothness, quality, and feeling close to those of photographic paper reproducing full-color silver halide photography were achieved.

Δ: The texture of a surface of the non-coat paper substrate of an undercoat was partly observed in the surface state of a gray highlight image area, resulting in certain concern about the texture. Its smoothness, quality, and feeling were somewhat inferior to those of photographic paper reproducing full-color silver halide photography but were practically unproblematic.

x: The dispersion of the fibers of the paper core material of an undercoat was observed in the surface state of a gray highlight image area, resulting in considerable concern about the texture. Its smoothness, quality, and feeling were inferior to those of photographic paper reproducing full-color silver halide photography.

(2) Evaluation of Adhesiveness

A mending tape (manufactured by Nichiban Co., Ltd.) was affixed to the thermal transfer image-receiving sheet, and the mending tape was stripped from the thermal transfer image-receiving sheet so that a plane of the mending tape had a positional relationship at an angle of 45 degrees with respect to a side of the thermal transfer image-receiving sheet. Thus, adhesiveness between the paper substrate and the porous polypropylene film was evaluated. Evaluation criteria are as follows.

(Evaluation Criteria)

○: No peeling occurred on the interface between the paper substrate and the porous polypropylene film.

Δ: Peeling occurred on a part of the interface between the paper substrate and the porous polypropylene film. Alternatively, damage to the porous polypropylene film due to heat was seen.

x: Peeling occurred on most of the interface between the paper substrate and the porous polypropylene film.

The result of each of the evaluations described above is shown in Table 2. The thermal transfer image-receiving sheets of Examples are found to be excellent in adhesiveness between the substrate layer and the porous layer and to be excellent in the texture of a print surface in comparison with the thermal transfer image-receiving sheets of Comparative Examples.

TABLE 2

| | Evaluation of Thermal Transfer Image-Receiving Sheet | |
|---|---|---|
| | (1) Texture | (2) Adhesiveness |
| Example 1 | ○ | ○ |
| Example 2 | ○ | ○ |
| Example 3 | Δ | ○ |
| Example 4 | ○ | ○ |
| Example 5 | ○ | ○ |
| Example 6 | ○ | ○ |
| Example 7 | ⊚ | Δ |
| Example 8 | ⊚ | ○ |
| Example 9 | ⊚ | ○ |
| Example 10 | Δ | ○ |
| Example 11 | ○ | ○ |
| Example 12 | ○ | ○ |
| Example 13 | ○ | ⊚ |
| Example 14 | Δ | ○ |
| Example 15 | ⊚ | ○ |
| Example 16 | ○ | ○ |
| Comparative Example 1 | X | ○ |
| Comparative Example 2 | X | ○ |
| Comparative Example 3 | X | ○ |
| Comparative Example 4 | ○ | X |
| Comparative Example 5 | ○ | X |
| Comparative Example 6 | ○ | X |

REFERENCE SIGNS LIST

10 Support for thermal transfer image-receiving sheet
11 Substrate
12 Press roller
13 Porous film
14 Cooling roller
15 Die
16 Resin
17 Stripping roller
20 Thermal transfer image-receiving sheet
21 Substrate layer
22 Adhesive layer
23 Porous layer
24 Primer layer
25 Color material-receiving layer
26 Support for thermal transfer image-receiving sheet

The invention claimed is:

1. A method for producing a support for a thermal transfer image-receiving sheet, the thermal transfer image receiving sheet comprising a substrate layer composed of a substrate, an adhesive layer composed of a melt-extruded resin, and a porous layer composed of a porous film that are layered in the order mentioned, the method comprising:
laminating the substrate and the porous film by the melt-extruded resin while passing the substrate and the porous film between a pair of rollers, the pair of rollers comprising a press roller and a cooling roller having a spacing d therebetween, and a midpoint defined along the spacing d between the press roller and the cooling roller; wherein
a difference (d–h) between the spacing d between the rollers and a total thickness h of the substrate layer, the adhesive layer, and the porous layer is 20 μm or more and 50 μm or less; and
wherein a die is arranged above a position between the midpoint and the cooling roller.

2. The method for producing a support for a thermal transfer image-receiving sheet according to claim 1, wherein the total thickness h is 150 μm or more and 350 μm or less.

3. The method for producing a support for a thermal transfer image-receiving sheet according to claim 1, wherein the adhesive layer has a thickness of 10 μm or more.

4. The method for producing a support for a thermal transfer image-receiving sheet according to claim 1, wherein the press roller is a rubber roller, and the cooling roller is a metallic roller.

5. The method for producing a support for a thermal transfer image-receiving sheet according to claim 1, wherein the substrate is arranged to be closer to the press roller, and the porous film is arranged to be closer to the cooling roller.

6. The method for producing a support for a thermal transfer image-receiving sheet according to claim 1, wherein a surface of the cooling roller has a ten-point average roughness (Rz) of 0 μm or more and 10 μm or less.

7. The method for producing a support for a thermal transfer image-receiving sheet according to claim 1, wherein the melt-extruded resin is polyolefin resin having a melting point of 100° C. or more, measured according to JIS K7121.

8. The method for producing a support for a thermal transfer image-receiving sheet according to claim 1, further comprising disposing a backing layer composed of a resin on a side of the substrate layer opposite to the adhesive layer.

9. The method for producing a thermal transfer image-receiving sheet according to claim 1, further comprising layering a color material-receiving layer on the porous layer of the support.

10. The method for producing a support for a thermal transfer image-receiving sheet according to claim 1, wherein the position between the midpoint and the cooling roller is located at a first distance from the press roller, and a second distance from the cooling roller, the second distance being approximately 5 mm less than the first distance.

11. The method as recited in claim 1, wherein a thickness of the substrate layer is 50 μm or more and 300 μm or less.

12. A method for producing a thermal transfer image-receiving sheet, the thermal transfer image receiving sheet comprising a substrate layer composed of a substrate, an adhesive layer composed of a melt-extruded resin, a porous layer composed of a porous film, and a color material-receiving layer that are layered in the order mentioned, the method comprising:
laminating the substrate and the porous film on one side of which the color material-receiving layer is formed in advance by the melt-extruded resin while passing the substrate and the porous film between a pair of rollers, the pair of rollers comprising a press roller and a cooling roller having a spacing d therebetween, and a midpoint defined along the spacing d between the press roller and the cooling roller, wherein
a difference (d–h) between the spacing d between the rollers and a total thickness h of the substrate layer, the adhesive layer, the porous layer, and the color material-receiving layer is 20 μm or more and 50 μm or less; and
wherein a die is arranged above a position between the midpoint and the cooling roller.

13. The method for producing a thermal transfer image-receiving sheet according to claim 12, wherein a primer layer is further disposed between the porous layer and the color material-receiving layer.

14. A thermal transfer image-receiving sheet comprising a substrate layer composed of a substrate, an adhesive layer composed of a melt-extruded resin, a porous layer composed of a porous film, and a color material-receiving layer that are layered in the order mentioned, wherein
the substrate and the porous film are laminated by the melt-extruded resin while passing the substrate and the porous film between a pair of rollers, the pair of rollers comprising a press roller and a cooling roller having a spacing d therebetween, and a midpoint defined along the spacing d between the press roller and the cooling roller; wherein,
a difference (d–h) between the spacing d between the rollers and a total thickness h of the substrate layer, the adhesive layer, and the porous layer is 20 μm or more and 50 μm or less; and
wherein a die is arranged above a position between the midpoint and the cooling roller.

15. A thermal transfer image-receiving sheet comprising a substrate layer composed of a substrate, an adhesive layer composed of a melt-extruded resin, a porous layer composed of a porous film, and a color material-receiving layer that are layered in the order mentioned, wherein
the thermal transfer image-receiving sheet is obtained by laminating the substrate and the porous film on one side of which the color material-receiving layer is formed in advance by the melt-extruded resin while passing the substrate and the porous film between a pair of rollers, the pair of rollers comprising a press roller and a cooling roller having a spacing d therebetween, and a midpoint along the spacing d between the press roller and the cooling roller; wherein
a difference (d–h) between the spacing d between the rollers and a total thickness h of the substrate layer, the adhesive layer, the porous layer, and the color material-receiving layer is 20 µm or more and 50 µm or less; and wherein a die is arranged above a position between the midpoint and the cooling roller.

* * * * *